(12) United States Patent
Patwari et al.

(10) Patent No.: US 6,473,038 B2
(45) Date of Patent: Oct. 29, 2002

(54) METHOD AND APPARATUS FOR LOCATION ESTIMATION

(75) Inventors: Neal K. Patwari, Fort Lauderdale, FL (US); Robert J. O'Dea, Fort Lauderdale, FL (US); Vernon A. Allen, Sunrise, FL (US); Matthew R. Perkins, Sunrise, FL (US); Monique J. Bourgeois, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/755,708

(22) Filed: Jan. 5, 2001

(65) Prior Publication Data

US 2002/0122003 A1 Sep. 5, 2002

(51) Int. Cl.$^7$ .................................................. G01S 3/02
(52) U.S. Cl. ........................................ 342/450; 342/457
(58) Field of Search ................................. 342/450, 457, 342/463; 455/456, 457

(56) References Cited

U.S. PATENT DOCUMENTS

| | | | | |
|---|---|---|---|---|
| 5,602,903 A | * | 2/1997 | LeBlanc et al. | 379/60 |
| 5,614,913 A | * | 3/1997 | Nichols et al. | 342/357 |
| 5,883,598 A | * | 3/1999 | Parl et al. | 342/457 |
| 6,327,474 B1 | * | 12/2001 | Ruutu et al. | 455/456 |
| 6,330,452 B1 | * | 12/2001 | Fattouche et al. | 455/456 |

OTHER PUBLICATIONS

Pottie, G.J., Wireless Sensor Networks, Information Theory Workshop, Jun. 22–26, 1998, pp. 139–140.

Durgin. G., et al. Measurements and Models for Radio Path Loss and Penetration Loss in and Around Homes and Trees at 5.85 GHz IEEE Transactions on Neural Networks, vol. 5, No. 1 (Jan. 1994) pp. 3–14.

Homayoun Hashemi, Indoor Radio Propagation Channel Proceedings of the IEEE, vol. 81, No. 7, Jul. 1993, pp. 943–967.

Fogel, D. B., An Introduction to Simulated Evolutionary Optimization, ZIEEE Transactions on Neural Networks, vol. 5, No. 1 (Jan. 1994) pp. 3–14.

Beutel J., Geolocation in a PicoRadio Environment, Diploma Thesis Department of Electrical Engineering ETH Zurich, Department of Electrical Engineering and Computer Science (sic), UC Berkeley, Chapter 2,5.

* cited by examiner

*Primary Examiner*—Dao Phan
(74) *Attorney, Agent, or Firm*—Andrew S. Fuller

(57) ABSTRACT

A system for locating a number of devices (112–130) by measuring signals transmitted between known location devices (112–118, 134–138, 214–218, 224–228) and unknown location devices (120–130, 222), and signals transmitted between pairs of unknown location devices (120–130,222), entering signal measurements into a graph function that includes a number of first sub-expressions, a number of which include signal measurement prediction sub-expressions, and have extrema when a predicted signal measurement is equal to an actual signal measurement, and optimizing the graph function.

45 Claims, 9 Drawing Sheets

METHOD AND APPARATUS FOR LOCATION ESTIMATION

FIELD OF THE INVENTION

This invention pertains to a system for determining the location of wireless devices.

BACKGROUND OF THE INVENTION

A variety of systems have been proposed which call for the ability to locate an object. For example, for asset control, it would be desirable to locate objects (e.g., laptop computers) within the confines of an office building. It is also desirable to be able to locate a cellular phone user.

The Global Positioning System (GPS) is an example of a prior art system for determining the location that uses a number of fixed or known location receivers or transmitters. A GPS receiver determines its position by processing signals received from a plurality of known location. A disadvantage of GPS is that in urban canyons or within buildings, signals from GPS satellites may be occluded.

For tracking objects inside an office building or the like, one approach is to arrange a group of receivers at fixed locations within the building, and to attach a transmitter to each object that is to be located. The fixed receivers are connected to a central computer that serves to determine the location of each object based on signals received from one or more of the group of receivers. Unfortunately this type of system requires the substantial installed infrastructure including all of the fixed receivers, and wired connections between them and the base stations. Moreover, these systems do not provide precise determination of location. A precision of +/-25% of the fixed receiver spacing is typical.

The strength of a received signal can in principle be used to determine the distance between a transmitter and a receiver. Unfortunately, in practice it is found that uncertainties in channel attenuation greatly diminish the accuracy that can be achieved.

It would be desirable to be able to use devices, the positions of which are not known in advance to locate other devices. It would be desirable to able to locate devices with which direct communication cannot be established.

What is needed is a system and method for determining location that requires less installed infrastructure.

Particularly it is unfortunate that it is problematic to obtain a location reading inside buildings and urban canyons.

Therefore, what is needed is a system and method which overcomes the above-mentioned shortcomings of the prior art.

BRIEF DESCRIPTION OF THE FIGURES

The features of the invention believed to be novel are set forth in the claims. The invention itself, however, may be best understood by reference to the following detailed description of certain exemplary embodiments of the invention, taken in conjunction with the accompanying drawings in which

DETAILED DESCRIPTION OF THE PREFERRED EMBODIMENTS

Figure 1:
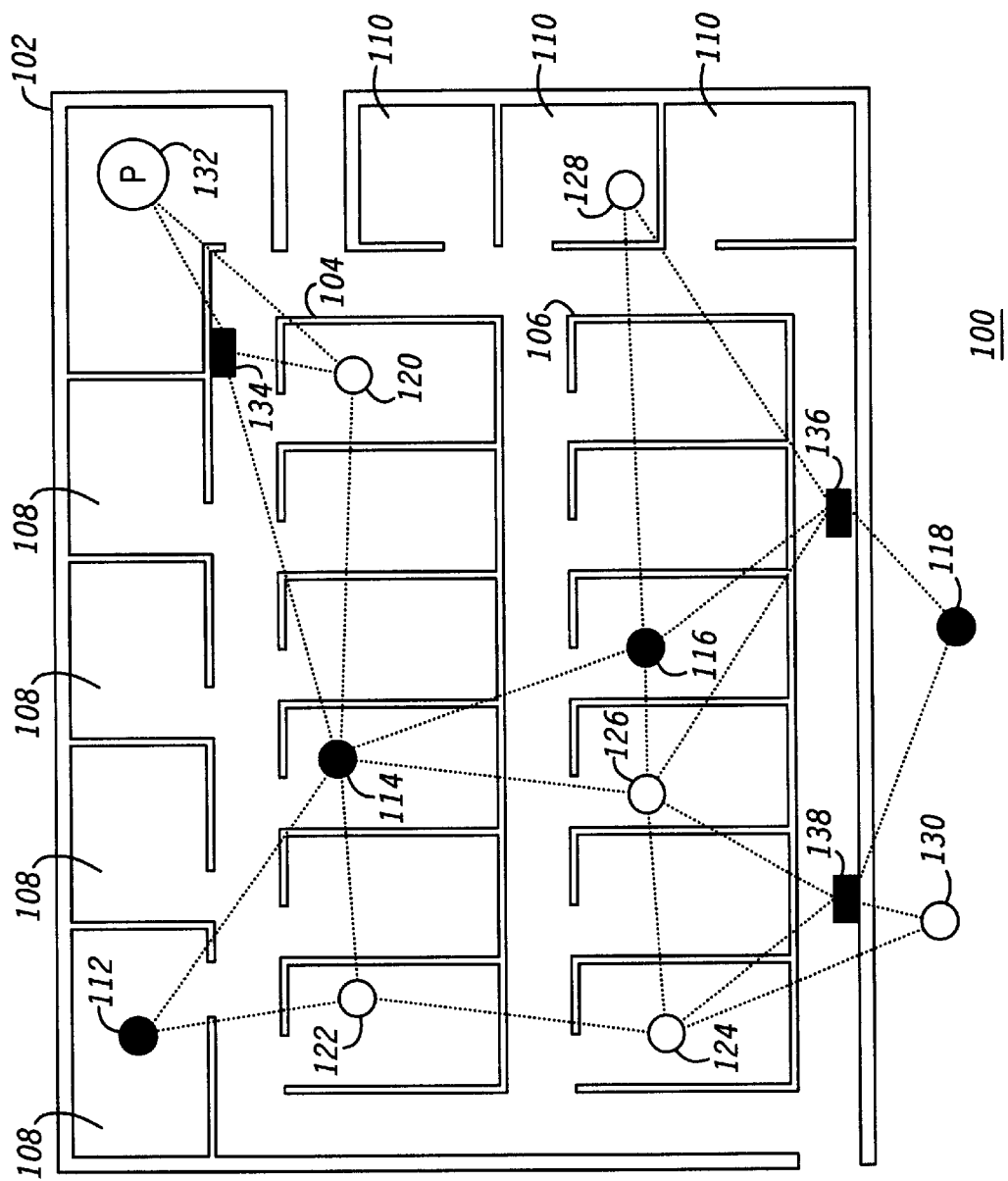
FIG. 1 is a floor plan of the interior of an office building, in which are located a number of wireless devices involved in determining each other's location.

While this invention is susceptible of embodiment in many different forms, there are shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

According to preferred embodiments of the present invention, a system and method operate to provide location estimates for mobile devices. The system does not require a great deal of installed infrastructure.

Moreover in the case of urban canyons and inside buildings where there are numerous obstructions to the propagation of signals (e.g. GPS signals), the system is able to function to provide location information for devices that might otherwise be out of range.

The system can be implemented using wireless communication devices, which are expected to proliferate during the next decade. The accuracy of the system in determining location will benefit from the proliferation because its' accuracy increases as the number of devices in a given volume increases.

FIG. 1 is a schematic is a floor plan 100 of the interior of an office building, in which are located a number of wireless devices involved in determining each other's location.

The floor plan comprises a perimeter wall 102 that encloses a plurality of offices. A first set of cubicles 104 and a second set of cubicles 106 are enclosed within the perimeter wall 102. A first set of walled offices 108 are located along a first side of the perimeter 102 and a second set of walled offices 110 are located along a second side of the perimeter wall 102. The cubical walls, perimeter wall 102, and the walls of the walled offices 108, 110 have different, frequency dependant electrical characteristics (i.e. real and complex indexes of refraction) which determine their transmissivity and reflectivity.

The circular objects 112–132 shown on the floor plan are mobile wireless devices, the locations of which are unknown and to be determined. These mobile wireless devices 112 132 can include, for example, transceiver security tags attached to valuable assets such as lap top computers, or wireless communication devices including the hardware described below such as cell phones. The darkened circles 112–118 represent mobile reference wireless devices. The locations of the reference devices 112–118 can be determined to within some measurement accuracy by communicating with fixed location devices or devices whose locations are predetermined (e.g., GPS satellites). Various reference location technologies are known in the prior art. The reference wireless devices 112–118 can for example be equipped with GPS receivers with which they can determine their position. Alternatively the position of one or more of the reference devices 112–118 could be determined by Time Difference of Arrival (TDOA) using three fixed receivers 134–138. Each reference device 112–118 could transmit a coded sequence, which is received by the three fixed receivers 134–138. The relative time shift between the times at which each of the fixed receivers 134–138 received the coded sequence and the known positions of the fixed receivers 134–138 could then be used to calculate the position of each reference device. Yet another possible way to provide a system that allows the reference devices to determine their position is to modulate a plurality of lights at different locations through out the office building according to a plurality of different code sequences. A reference device 112–118 can then ascertain its location by identifying a particular code with which light that it detects (using a photo-detector) has been modulated. Co-pending applications, Ser. No. 09/733,717 filed Dec. 8, 2000, entitled Interference-Robust Coded-Modulation Scheme for Optical Communications and Method for Modulating Illumination for Optical Communications, "and Ser. No. 09/755,707, entitled "Optically Based Location System and Method for Determining a Location at a Structure", assigned to Motorola, Inc., "that have been assigned to assignee of the present invention teach a location system that uses code modulated lights and are hereby incorporated herein by reference.

The non-darkened circles 120–130 represent blind mobile wireless devices as opposed to reference devices. The particular methods taught by the invention can locate the blind devices 120–130 as will be described below in more detail. Dashed lines connect devices that are within range of each other. Note that not all devices are within range of each device. A central processing node 132 serves to perform calculations involved in determining the location of reference devices 112–118 and blind devices 120–130 as will be described below in more detail. According to some embodiments the processing node 132 is not used and the aforementioned calculations are distributed among one or more of the wireless devices 112–130. Note that both reference device 118 and blind device 130 are located outside of the building. The former two devices can be wireless communication devices, e.g. telephones. These two outside wireless devices 118, 130 can cooperate with one or more of the other wireless devices 118–132 in determining their locations. Although only one mobile device 120 is within range of the processor node 132, other mobile devices can communicate with the processor node by relaying messages through a sequence of devices. Alternatively the range of the wireless devices 112–132 can be extended through the use of high power transmitters so all the devices 112–132 will be within range of each other.

Figure 2:
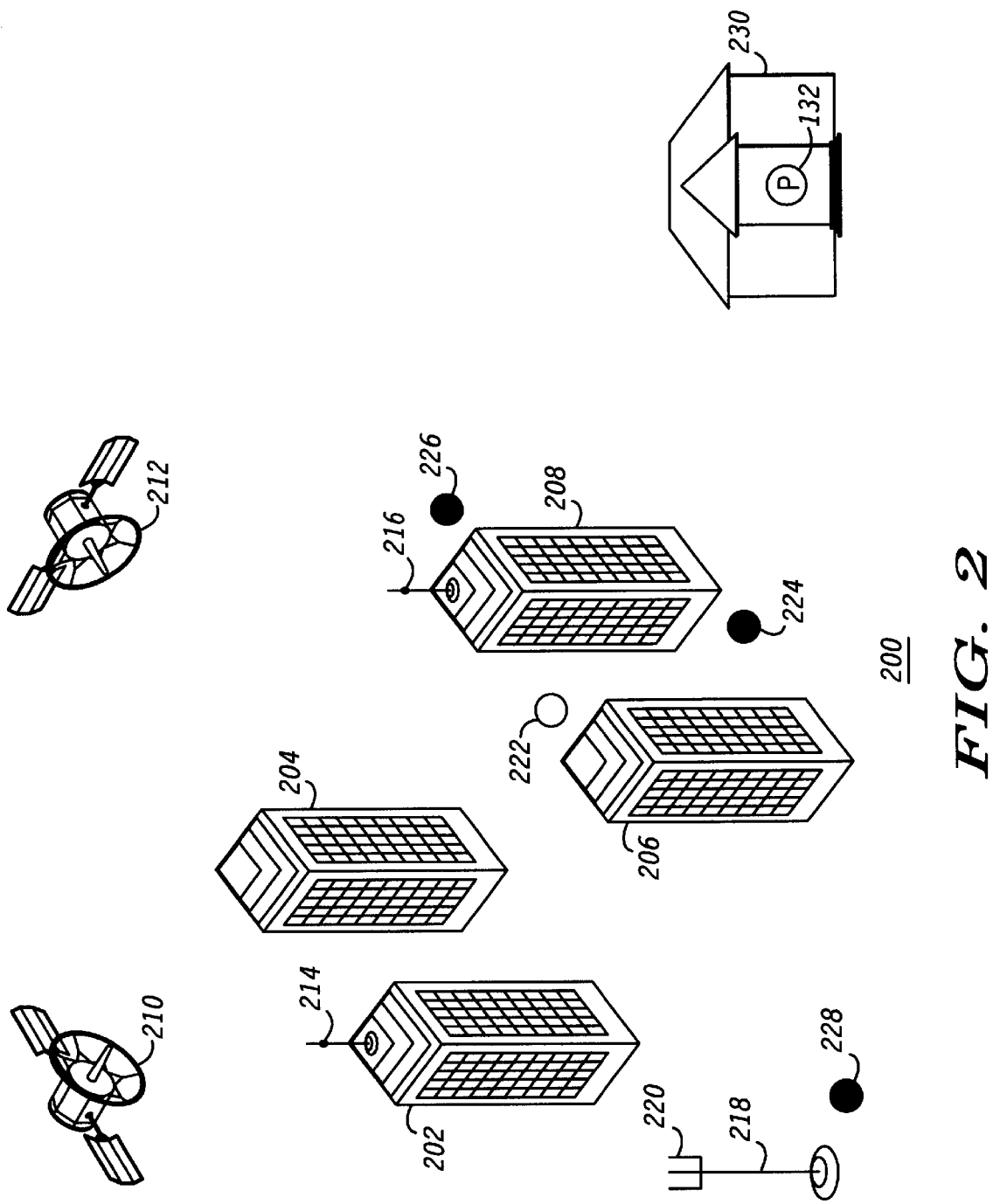
FIG. 2 is a schematic illustration of an urban area serviced by GPS satellites and cellular network towers, and in which are located wireless devices involved in determining each other's location according to a preferred embodiment of the invention.

FIG. 2 is a schematic illustration of an urban area 200 serviced by GPS satellites and cellular network towers 214–218. Referring to FIG. 2 first 202, second 204, third 206 and fourth 208 buildings are located in the urban area 200 have the potential of blocking wireless transmission signals, and/or causing multi-path interference. Two GPS satellites 210, 212 are shown in orbit within view of the urban area 202. In practice more than two satellites would be in view of the urban area 202. Signals from at least four GPS satellites must be received in order for a GPS receiver to determine its position. First and second base station transceivers 214 and 216 are located atop the first 202 and third 206 buildings respectively. The base station transceivers 214 and 216 can be used to make signal measurements in order to determine the distances to the mobile wireless devices 222–228. A third base station 218 that is located to the left of the four buildings is equipped with a phase-array or 'smart' antenna 220. The smart antenna 220 comprises a plurality of radiating elements as well as processing electronics. Using a direction of arrival (DOA) algorithm, the smart antenna 220 can determine the direction to various wireless devices 222–228 from which it receives signals.

A blind device 222 is seen in FIG. 2 to be situated between four buildings 202–208. Blind device 222 can be blind device 130 shown in FIG. 1. That is to say, that wireless devices 112–130 involved in intra-building location could also be in communication with externally located wireless devices so that the intra-building wireless devices' 112–130 location could be determined within a broader area coordinate system. First, second, and third external reference devices 224–228 are situated outside of the four buildings 202–208. One of the external reference devices could be the same device as reference device 118.

A mobile switching center 230 is in communication with the three base station transceivers 214–218. The mobile switching center 230 comprises a processing node 132. The processing node 132 is electrically coupled to the three base stations 214–218 to receive signals from them through the mobile switching center 230. Processing node 132 can be provided with a communication interface for communication with an external information system such as an emergency-911 system (not shown) for the purpose of communicating location estimates.

The buildings 202–208 block signals from one or more of the GPS satellites 210, 212 from reaching the blind device 222, or perhaps the blind device 222 is not equipped with a GPS receiver.

The fact that a reference device 224–228 is in communication with a particular base station can be used to locate it to within an area approximately equal to a wireless network cell. For a better estimate, TDOA using more than one, and preferably three or more base stations 214–218 could be used to locate reference devices. If a reference device provided with hardware and software to enable it to be located by TDOA is only within range of one base station 214–218, then it may effectively become a blind device. According to the teachings of the invention a measurement of a signal transmitted between the blind device and the one or more base station(s) that it is in range of contributes to determining the location of the blind device.

Figure 3:
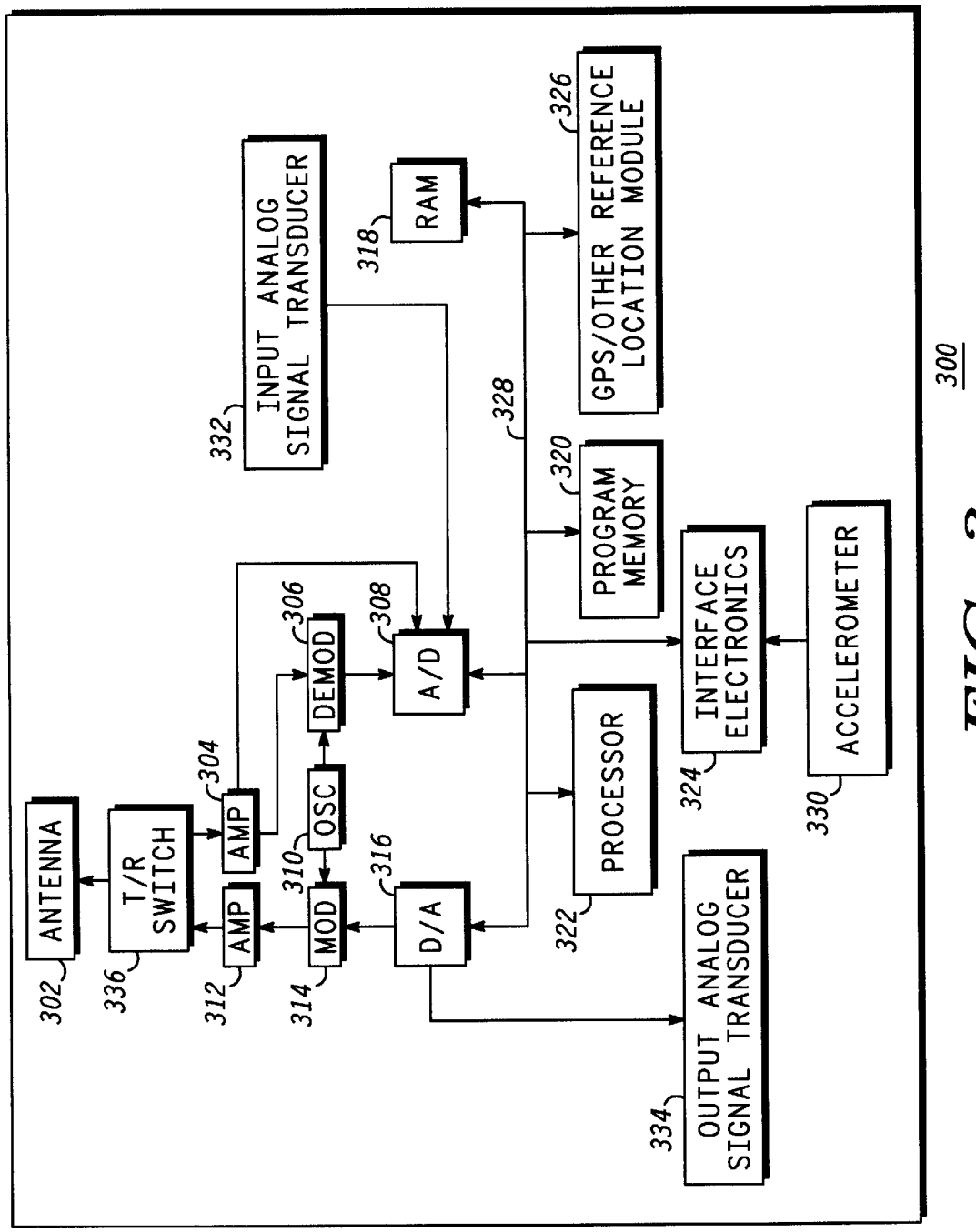
FIG. 3 is a block diagram of a wireless device according to a preferred embodiment of the invention.

FIG. 3 is a schematic of wireless communication device 300 (transceiver) according to a preferred embodiment of the invention. Referring to FIG. 3 an antenna 302 is electrically coupled to a first terminal of a transmitter-receiver switch 336. A second terminal of the transmitter-receiver switch 336 is electrically coupled to an input of a received signal amplifier 304. An output of the received signal amplifier 304 is electrically coupled to a demodulator 306.

A local oscillator 310 is also electrically coupled to the demodulator 306. An output of the demodulator 306 is electrically coupled to a first input of an analog-to-digital converter 308. A signal tapped off an amplifier feedback loop in the received signal amplifier 304 is electrically coupled to a second input of the analog-to-digital converter 308. The signal from the amplifier feedback loop is indicative of the power of a received signal. Such a measurement is termed a Received Signal Strength Indicator (RSSI). In order to make RSSI a useful indicator of distance, a signal is transmitted at a predetermined power. The antenna 302, T/R switch 336, received signal amplifier 304, and demodulator 306 make up a receiver.

An output of a digital-to-analog converter 316 is electrically coupled to a modulator 314. The local oscillator 310 is also coupled to the modulator 314. An output of the modulator 314 is electrically coupled to an input of a transmitted signal amplifier 312. An output of the transmitted signal amplifier 312 is electrically coupled to a third terminal of the transmitter-receiver switch 336. The modulator 314, transmitted signal amplifier 312, T/R switch 336, and antenna 302 make up a transmitter.

An output of the analog-to-digital converter 308, an input of the digital-to-analog converter 316, Random Access Memory (RAM) 318, program memory 320, a processor 322, accelerometer interface electronics 324, and a GPS or other reference location module 326 are electrically coupled to a digital signal bus 328. The program memory 320 can for example take the form of an Electrically Erasable Programmable Read Only Memory (EEPROM). The processor 322 preferably comprises a programmable Digital Signal Processor (DSP). The accelerometer interface electronics are used to interface to an accelerometer 330. The interface electronics 324 can be electrically coupled to an interrupt pin of the processor 322. The interface electronics 324 can be provided so that when the wireless device 300 is moved, the accelerometer outputs a signal which is input to the interface electronics 324 which outputs a signal that causes an interrupt to be applied to the processor 322. A program that is executed in response to the interrupt request is a program involved in determining the location of the wireless device. Such programs are described below in more detail. The program is stored in program memory 320. Although it is preferable to use an accelerometer to trigger execution of location programs, the location programs could be alternatively written to periodically determine location.

Aside from a GPS receiver, the reference location module 326 could alternatively, for example, comprise a module which determines location within an office by detecting modulation of received light as taught in the above mentioned co-pending applications entitled "Optically Based Location System and Method for Determining a Location at a Structure" and "Interference-Robust Coded Modulation Scheme for Optical Communications and Method for Modulating Illumination for Optical Communications. The reference location module 326 could alternatively, for example, use other proximity sensor technology. In devices that are blind by design, which may be the case for example for some wireless communication devices (e.g., cell phones without GPS), the reference location module 326 would not be present.

An input analog signal transducer 332 is electrically coupled to a second input of the analog-to-digital converter 308. The input analog signal transducer 332 could for example take the form of a microphone. An output signal transducer 334 is electrically coupled to a second output of the digital-to-analog converter 316. The output signal transducer 334 could for example take the form of a speaker.

In the case of a wireless device that is used to tag moveable objects in a building for asset control purposes, it is possible to dispense with the input and output analog signal transducers 332 and 334.

The block diagram shown in FIG. 3 can describe the internal architecture of processing node 132. However for processing node 132 the signal transducers 332 and 334 are not required. If the processing node 132 is fixed, it is preprogrammed with it's own location coordinates so as to make the other reference location module 326 superfluous. Additionally, if the processing node 132 is fixed then the accelerometer 330, and interface electronics 324 can be eliminated. A workstation or personal computer electrically coupled to a wireless receiver can also be used as processing node 132.

Figure 4:
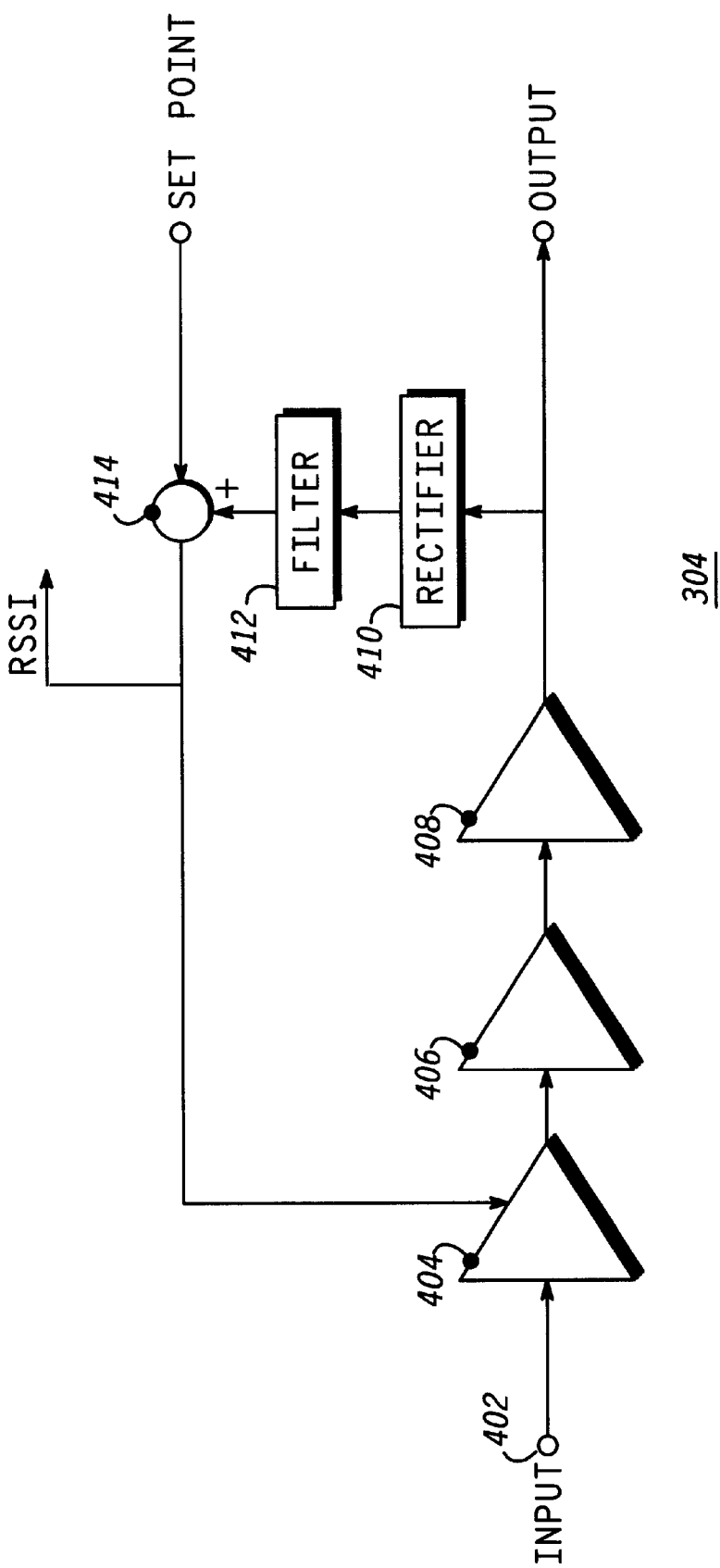
FIG. 4 is a block diagram of a received signal amplifier according to a preferred embodiment of the invention.

FIG. 4 is a block diagram of a received signal amplifier 304 according to a preferred embodiment of the invention. Referring to FIG. 4 the received signal amplifier 304 comprises an input 402 electrically coupled to a first amplifier 404, a second amplifier 406 electrically coupled to the first amplifier 404, and a third amplifier 408 electrically coupled to the second amplifier 406. An output of the third amplifier 408 is electrically coupled to the demodulator 306, and a rectifier 410. The rectifier 410 is electrically coupled to a low pass filter 412. An output of the low pass filter 412 is electrically coupled to a first input of a differential amplifier 414. A set point voltage, which corresponds to a power output setting for the received signal amplifier 304, is applied to a second input of the differential amplifier 414. An output of the differential amplifier 414 is electrically coupled to the second input of the analog-to-digital converter 308, and to a gain setting input of the first amplifier 404. The output of the differential amplifier is a RSSI. The received signal amplifier 304, in combination with the analog-to-digital converter 308, constitutes a signal strength measurer.

Received signal strength measurements involving a first blind device 120–130 (FIG. 1) and a second blind device 120–130 (FIG. 1), one of the base stations 214–218 (FIG. 2), or one of the fixed receivers 134–138 (FIG. 1) can be used in determining the location of other mobile wireless devices in the vicinity of the first blind device 222, in accordance with the teachings of the present invention.

Figure 5:
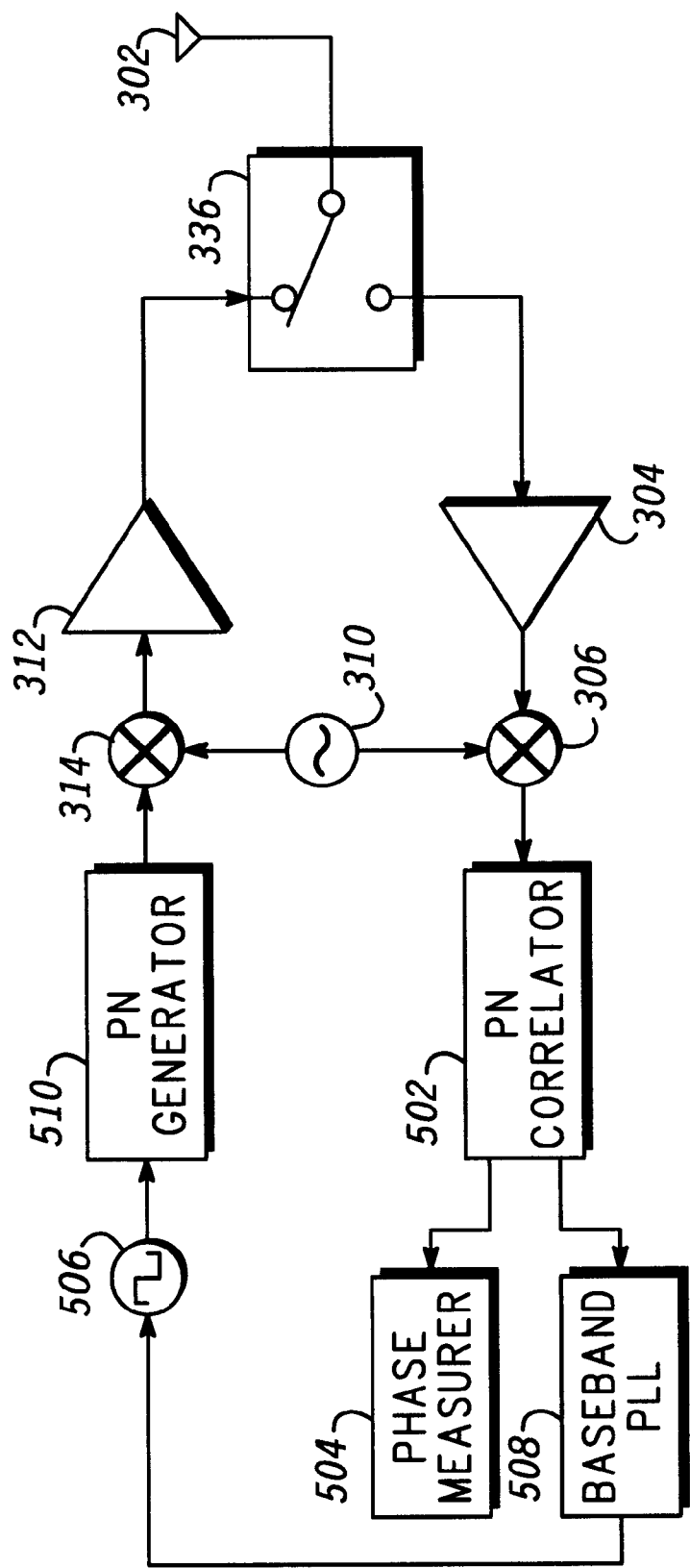
FIG. 5 is a block diagram of a Direct Sequence Spread Spectrum transceiver used to make to way two-way time of arrival distance measurements according to a preferred embodiment of the invention.

FIG. 5 is a functional block diagram of a Direct Sequence Spread Spectrum transceiver 500 used to make to way two-way Time of Arrival distance measurements. Certain hardware elements shown in FIG. 3 are omitted in FIG. 5 because FIG. 5 is intended to highlight a particular function that can be carried out using the hardware shown in FIG. 3. Referring to FIG. 5, the antenna 302, transmitter-receiver switch 336, received signal amplifier 304, transmitted signal amplifier 312, demodulator 306, modulator 314, and local oscillator 310 from FIG. 3 are shown.

The demodulator 306 is electrically coupled to a local oscillator 310 and a pseudo random number sequence (PN) correlator 502. A PN generator 510 is also electrically coupled to a PN correlator 502. The PN correlator 502 serves to perform a correlation calculation between a version of the PN received from the demodulator 306 and a version of the PN input by PN generator 510. The PN correlator 502 inter-operates with a phase measurer 504 that determines a relative phase shift between the two versions of the PN that gives a maximum correlation calculation result. An output of the PN correlator 502 is electrically coupled to an input of a base band phase locked loop 508. The base band phase locked loop 508 is electrically coupled to a clock 506. The clock 506 is electrically coupled to the PN generator 510. The PN generator is electrically coupled to the modulator 314.

The correlater 502, phase measurer 504, base band phased lock loop 508, and PN generator 510 can be implemented as one or more programs stored in program memory 320, and executed by processor 322.

The same transceiver 500 can be used by two or more devices that are involved in a two-way time of arrival (TOA) distance measurement. One device is an initiator, and another device is a responder. In operation, an initiator first generates and transmits a PN. A responder receives the PN and using phase locked loop 508 adjusts the rate clock 506 by which it measures time, and that is used to drive the PN generator 510, to match a chip rate of the received base band signal. After waiting a period of time the responder retransmits the PN. The period of time that the responder waits is preferably determined by the following expression:

$$T=R*BT,$$

where

BT is the duration of the pseudo random number sequence, and

R is a random integer.

The duration of the pseudo random number sequence multiplied by the speed of light (c) is preferably greater than the range of the transceiver, so as to avoid ambiguity in the measured distance.

Introducing randomness in the response tends to avoid collisions between multiple responding devices, if they are programmed to respond to the same pseudo random number sequence.

Upon receiving the PN retransmitted by the responder, the initiator, using phase measurer 504 inter-operating with the correlater 502, determines an offset time between the time at which the pseudo random number was first sent by the initiator and the time at which the pseudo random number was received back from the responder. The offset time is multiplied by C to obtain a measurement of the distance separating the initiator and the responder. The correlation operation is a signal measurement in that the phase of the received signal is measured.

Figure 6:
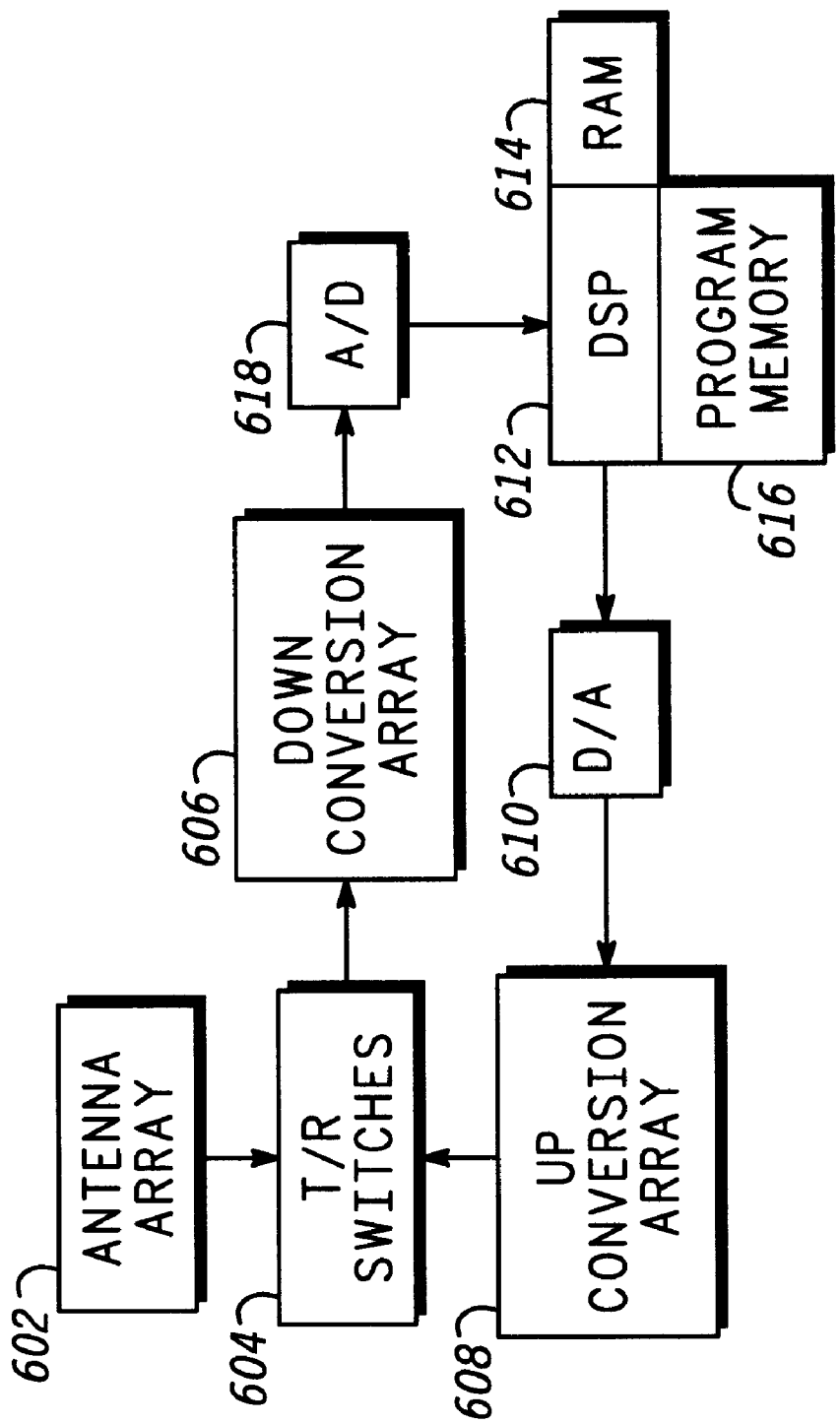
FIG. 6 is a block diagram of a smart antenna according to an alternative embodiment of the invention.

FIG. 6 is a block diagram of the smart antenna 220 according to an alternative embodiment of the invention. Referring to FIG. 6 an antenna array 602 is electrically coupled to a transmitter-receiver switch array 604. The antenna array 602 comprises a phased array, so that signals transmitted from a selected direction can be selected. The transmitter-receiver switch array 604 is electrically coupled to a down conversion array 606, and an up conversion array 608. The down conversion array 606 is electrically coupled to a multi-channel analog-to-digital converter 618. The up conversion array 608 is electrically coupled to a multi-channel digital-to-analog converter 610. A digital signal processor 612 is electrically coupled to the multi-channel analog-to-digital converter 618 and to the multi-channel digital-to-analog converter 610. The digital signal processor 612 is integral with or electrically coupled to random access memory 614, and program memory 616. A Direction of Arrival (DOA) algorithm is stored in program memory 616 and run by the digital signal processor 612. The DOA algorithm processes signals digitized by the multi-channel analog-to-digital converter 618 in order to select signals arriving from particular directions at the antenna array 602. The DOA algorithm determines the direction in which a remote transmitter is located. Signals can also be transmitted in a particular direction by the antenna array 602 by controlling the relative phasing of signals applied to a plurality of antennas in the antenna array 602.

A single DOA measurement for a particular mobile wireless device absent other information would merely determine its direction. However such a measurement can be utilized according to the teaching of the invention to contribute to the location estimates for the particular mobile device and other mobile devices in its vicinity.

Rather than being fixed at base station 218, the smart antenna 220 can be mounted to a first mobile device such as a vehicle mounted wireless device. If the bearing of the first mobile device is not known then the direction to other mobile devices, (e.g. transmitting mobile devices) will not be of great use, however the difference between the directions to two other devices as measured using a smart antenna at a first device will be invariant under rotations of the first mobile device, and can, according to the teachings of the invention, be used in estimating the locations of the three devices and others in their vicinity.

As will presently be described, the invention provides a method and system for determining the positions of a plurality of mobile wireless devices, preferably including two or more blind mobile devices, by transmitting signals between subsets of the plurality of the devices that are within range of each other. The range of the devices can be so small that each device in the plurality of mobile devices cannot reach all of the other devices in the plurality of devices. Designing the wireless devices to have a low range enables battery power to be conserved. In spite of the limited range, the invention is able to improve the accuracy of location estimates for the devices by having more devices participate in the location estimating.

According to some embodiments of the invention, signals transmitted between each member of a plurality of wireless devices, and other wireless devices in the plurality of wireless devices that are within range of it are measured to obtain a set of actual measurement values. The group of wireless devices preferably comprises at least two blind devices, the locations of which are not known at the beginning of the measurement process. A plurality of sets of coordinates are postulated for the plurality of wireless devices. The postulated coordinates can, for example, be the last known coordinates of the wireless devices, or coordinates selected randomly using a computerized random number generator. The outcome of the measurements is calculated based on the postulated coordinates to obtain a plurality of predicted measurement values. The predicted measurement values are compared to the actual measurement values, and the postulated coordinates are corrected based on the outcome of the comparison of the actual measurement values and the predicted measurement values. The steps of predicting the outcome measurements, comparing the predicted measurement values to the actual measurement values, and correcting the postulated measurements are preferably repeated until no further improvement in the match between actual and predicted values is expected. In practice the process of comparing the predicted measurement values to the actual measurement values and correcting the postulated measurements can be embodied in a computer program which optimizes (finds the minimum or maximum) a mathematical function.

According to some embodiments of the invention a mathematical function that depends on (A) a predicted signal measurement value that in turn depends on postulated coordinates and (B) actual signal measurements is optimized by determining postulated coordinate values that (at least approximately) maximize or minimize the function. The optimized values of the coordinates correspond to location estimates. The aforementioned mathematical function will be referred to hereinafter as the graph function (GF). In mathematical notation the graph function preferably includes a sub-expression of the form:

$$Sub\_Exp\_1 = f1(ASM, f2(PC))$$

where

ASM is a set of actual signal measurements,

PC is a set of postulated coordinate variables, and f1, and f2 are mathematical functions or computer program subroutines.

f2 gives the predicted signal measurements based on PC. PC preferably includes the coordinates of at least two mobile blind devices, and ASM preferably includes signal measurements between two mobile blind devices. f2 preferably embodies (e.g. in the form of a sub-routine) a mathematical expression that can be written in closed form. Alternatively, f2 could for example comprise a ray-tracing program that predicts the signal measurement at one position based on a signal transmitted from a second position.

The graph function can include the coordinates of numerous blind devices and only a few (preferably at least two; more preferably at least three) reference devices, and depends on many signal measurements between the devices. Even though there may be only a few reference devices, and the signal measurements may contain large errors, by using many measurements, the method of the invention is able to locate numerous blind devices quite accurately. The term graph function is appropriate in that an arrangement of transceivers in which some transceivers are in range of others can be represented by a graph of the locations of the transceivers in which each edge corresponds to a signal measurement made between two devices, and edge lengths correspond to distances separating the two devices. As used herein, the word sub-expression includes a term, exponent, factor, or argument of transcendental function or part thereof. According to some embodiments of the invention at least one graph function which depends on the coordinates of at least two blind wireless devices is optimized in order to determine those coordinates. According to the invention, the location of many blind wireless devices can be determined even though the locations are not known before the calculations are performed.

The signal measured in the actual signal measurement and predicted in the predicted signal measurement is preferably a signal used for TOA. The transceivers shown in FIG. 5 can be used to send and receive signals used for two-way TOA distance measurement. Alternatively, the signal can be a signal used for RSSI. When using RSSI the separation between two transceivers is deduced based on a channel attenuation model.

The graph function preferably comprises a plurality of sub-expressions of the following form:

$$Sub\_Exp\_2 = f3(ASM1 - f4(PC1, PC2))$$

where

ASM1 an actual signal measurement,

PC1 is a set of postulated coordinates corresponding to a first wireless device involved in making the actual signal measurement, PC2 is a set of postulated coordinates corresponding to a second wireless device involved in making the actual signal measurement, f3 is a function, and f4 is a function that predicts the actual signal measurement based on PC1 and PC2.

In the case where the actual signal measurement is a received signal strength measurement (RSSI), f4 preferably comprises a channel attenuation model which predicts signal strength reaching a receiving device based on the distance between it and a transmitting device. The channel attenuation model (CH_A_1) preferably takes the form:

$$P_{i,j} = P_o(d_0) - 10n \log\left(\frac{d_{i,j}}{d_o}\right)$$

where $P_{i,j}$ is the power in decibels predicted to reach one of an ith and jth devices from the other, $d_o$ is a reference distance used to make a reference measurement, $P_o$ is the power in decibels that reaches a receiving device that is separated from a transmitting device by a distance $d_o$, and $$d_{i,j} = \sqrt{(X_i - X_j)^2 + (Y_i - Y_j)^2 + (Z_i - Z_j)^2}$$

where $(X_i, Y_i, Z_i)$ is a set of postulated coordinates for the ith device, $(X_j, Y_j, Z_j)$ is a set of postulated coordinates for the jth device, and n is an experimentally determined parameter for a given environment, that characterizes a loss in power as a function of distance.

As discussed below in more detail n can be selected based on signal measurements between reference devices.

The graph function preferably comprises a plurality of sub-expressions of the form Sub_Exp_2, one for each signal measurement between a pair of devices (for each edge). The function or procedure f3 in Sub_Exp_2 preferably has the property that it has an extremum when the actual signal measurement ASM1 equals the signal measurement predicted by f4. The postulated coordinate values that optimize the graph function will not necessarily optimize each sub-expression of the form Sub_Exp_2 within the graph function. The latter is due to the fact that the signal measurements contain errors leading to inconsistencies in the postulated coordinates that would optimize the sub-expressions separately. It is preferable to use a graph function that involves multiple sub-expressions that depend on the postulated coordinates of a single device. The postulated coordinates are optimized under the conditions stated above. By doing so the effect of errors of individual actual signal measurements is reduced. The optimization increases the accuracy of location estimates that are the values of the postulated coordinates corresponding to an extremum of the graph function.

Preferably the set of postulated coordinate variables includes coordinate variables for at least two blind devices, the locations of which are not known before conducting the optimization.

More preferably, the graph function has a sub-expression that involves a probability of error function, in which an argument is the difference between the actual measurement and the predicted measurement. In mathematical notation this is:

$$Sub\_Exp\_3 = PE(ASM1 - f4(PC1, PC2))$$

where

ASM1, PC1, PC2 and f4 are defined above, and

PE is a probability of error function. The probability of error function is preferably is a continuous probability density function.

Preferably, there are sub-expressions of the form Sub_Exp_3 for a plurality of edges of the graph. Preferably there are at least two sub-expressions in the graph function that involve the coordinate of each device.

Even more preferably, the probability of error function comprises a Guassian distribution function sub-expression. The Gaussian distribution sub-expressions are preferably of the form:

$$\text{Sub\_Exp\_4} = \exp\left\{-\frac{1}{2}\left(\frac{ASM - f4(PC1, PC2)}{\sigma}\right)^2\right\}$$

where

ASM, PC1, PC2 and f4 are defined above, and $\sigma$ is the standard deviation of the measurement process used to obtain the ASM.

A plurality of Gaussian sub-expressions, each corresponding to a single edge of the graph, are preferably multiplied together in the graph function. The graph function is preferably derived by taking the negative of the natural logarithm of the product of the Gaussian factors. The latter step eliminates the exponential function from the graph function, and converts the product to a sum, and reduces the computational cost of evaluating the function and its derivatives. Evaluation of the derivatives of the graph function is necessary for some types of optimization algorithms such as the conjugate gradient method.

Alternative probability of error functions that can be used in connection with the invention and that are especially suited to modeling the distribution of errors in signal measurements include the Rayleigh distribution, the Wiebull distribution, and the Suzuki distribution. Each of the foregoing probability of error functions include one or more statistical model parameters that determine the shape of the function. The Rayleigh distribution includes a Rayleigh parameter. The Weibull distribution includes a shape parameter, and an RMS value of the signal measured. The Suzuki distribution includes two parameters which play a role analogous to the standard deviation in the Guassian distribution.

Using a function that involves multiple measurements for each wireless device has the advantage that the effect of one erroneous measurement in the location estimate for each wireless device is reduced. Using Gaussian probability of error functions has the advantage that each measurement is given appropriate weight in view of the standard deviation of the measurement. Sub_Exp_4 has a maximum (of unity) when the actual signal measurement is equal to the predicted signal measurement. Although actual signal measurements may have large errors, according to the teachings of the invention, the effect of individual errors is reduced by constructing a graph function in which signal measurements are given weight according to their associated standard deviation.

Alternatively, a Rayleigh probability of error function can be used. Probability of error functions contain one or more statistical model parameters, such as the standard deviation $\sigma$ in the case of the Guassian probability of error function.

The graph function also preferably includes a plurality of sub-expressions that includes location estimates of reference devices. A reference device sub-expression preferably takes the form:

$$\text{Sub\_Exp\_5} = f5(PC3, RC3)$$

where

PC3 are the postulated coordinates for a reference device,

RC3 are the coordinates of the reference device determined by a reference location technology (e.g., GPS, TDOA using fixed transceivers), and f5 is a function that has an extremum (maximum or minimum) when the reference location technology coordinates RC3 are equal to the postulated coordinates PC3.

More preferably, the reference device sub-expression preferably comprises a sub-expression including a probability of error function, in which an argument is the difference between a postulated coordinate and a coordinate determined by a reference location technology. That is:

$$\text{Sub\_Exp\_6} = PE(PC4-RC4)$$

where

PC4 is a postulated coordinate for a reference device,

RC4 is the coordinate of the reference device determined by a reference location technology (e.g., GPS, TDOA using fixed transceivers) that corresponds to PC4.

Even more preferably, the graph function comprises a sub-expression of the following form.

$$\text{Sub\_Exp\_7} = \exp\left[-\frac{1}{2}\left(\frac{(PC4 - RC4)}{\sigma_B}\right)^2\right]$$

where

PC4 and RC4 are defined above, and $\sigma_B$ is the standard deviation associated with the measurement of RC4 by the reference location technology.

The graph function preferably comprises a sub expression of the form:

$$\text{Sub\_Exp\_8} = \prod_{i=1}^{N} \prod_{j \in H_i, j \neq i} \left\{ \exp\left[-\frac{1}{2}\left(\frac{(P_{i,j} - P'_{i,j})}{\sigma_{db}}\right)^2\right]\right\}$$

where i is a first index that denotes wireless devices involved in a location estimation calculation;

j is a second index that denotes wireless devices involved in a location estimation calculation;

N is the number of wireless devices involved in estimating each other's location, $H_i$ is the set of all wireless devices that are in range of the ith wireless device, $P'_{i,j}$ is the measurement of power (expressed in decibels) that reaches one of the ith and jth devices from the other, $P_{i,j}$ is the power (expressed in decibels) that is predicted to reach one of the ith and jth devices from the other based on a channel attenuation model, and $\sigma_{dB}$ is the standard deviation ascribed to the measurement process used to measure $P'_{i,j}$. It is noteworthy that dB applies to $P'_{i,j}$ because errors in power expressed in decibels are distributed according to a Guassian distribution. Expressed in absolute units, the fit of errors of the power measurement would not fit a Guassian distribution as well.

The set of wireless devices involved in power measurements that enter into Sub_Exp_8 includes fixed devices, non-fixed reference devices, and blind devices.

A channel attenuation model such as CH_A_1 can be substituted into Sub_Exp_8 for $P_{i,j}$ and $P'_{i,j}$ to obtain a mathematical expression that depends on the distance construed from signal measurements involving the N wireless devices involved in estimating each others' coordinates and postulated coordinates of the N devices. The values of the postulated coordinates of the N wireless devices that correspond to the maximum of the resulting equation correspond to location estimates for the N devices according to the present invention. Various algorithms are known for determining the value of variables that optimize a multi-variable function. Sub_Exp_8 is a product of a plurality of factors (a type of sub-expression). Note there are a sequence of factors that involve the coordinates of the for each ith device.

Not all devices that are involved in determining each other's location will be within range of each other. According to a preferred embodiment of the invention, the graph function preferably includes an out-of-range sub-expression that takes into account the information that one or more pairs of devices are not within range of each other. The out-of-range sub-expression depends on the distance (as determined using the sets of postulated coordinates for the two devices) between two devices that are known to be out of range of each other. First and second devices can be determined to be out of range of each other if a signal sent from the first device requesting response is not answered by the second device. The out-of-range sub-expression preferably tends to increase the postulated distance between two devices that are out of range of each other. For example if the extremum of the graph function that corresponds to estimated coordinates is a maximum (as opposed to a minimum) the out-of-range sub-expression preferably monotonically increases as the postulated distance between the two devices that are determined to be out of range of each other. On the other hand, if estimated coordinate extremum of the graph function is a minimum, the out-of-range sub-expression preferably monotonically decreases as the distance between the two devices increases. More preferably, the out-of-range sub-expression asymptotically approaches a fixed value as the postulated distance between two devices that are out of range of each other increases.

The graph function preferably comprises the following out-of-range sub-expression:

$$\text{Sub\_Exp\_9} = \prod_{i=1}^{N} \prod_{j \notin H_i, j \neq i} \int_{P_{i,j}-P_{thresh}}^{\infty} \exp\left[-\frac{1}{2}\left(\frac{S}{\sigma_{db}}\right)^2\right] dS$$

where $P_{thresh}$ is the threshold power which can be detected by a wireless device. As in the case of the previous sub-expression, an expression for a channel attenuation model can be substituted for Pi,j in Sub_Exp_9 to obtain a mathematical function of postulated coordinates N devices. Sub_Exp_9 represents a probabilistic guess at the location of wireless devices based on the fact that they are outside of the range of other wireless devices. Whereas Sub_Exp_8 is used to estimate the location of N wireless devices, based on measurements of the strength of signals transmitted between wireless devices that are within range of each other, Sub_Exp_9 is used to improve location estimates based on information that particular pairs of wireless devices are out of range of each other. Sub_Exp_9 also includes a sequence of factors that involve the postulated coordinates of each ith wireless device. Each exponential factor of Sub-Exp-9 monotonically increases as the postulated distance (on which $P_{ij}$ is assumed to depend in a monotonically decreasing manner) between two devices that are out of range of each other increases. Additionally each exponential factor asymptotically approaches a fixed value. If used in a graph function in which the extremum to be found is a maximum, each exponential factor will tend to push apart the postulated coordinates of devices that are out of range of each other, however the amount of this push will drop as the distance is increased.

Alternatively, the out-of-range sub-expression depends on the distance between postulated coordinates of two devices that are determined to be out of range of each other, and has an extremum when the distance is some value greater than a threshold distance for communication between the two devices. The extremum of the out-of-range sub-expression can, for example, be the threshold distance multiplied by a predetermined factor greater than unity. The predetermined factor is preferably in the between 1 and 10, more preferably between 1.5 and 5.

Preferably the graph function also comprises a sub-expression of the form:

$$\text{Sub\_Exp\_10} = \prod_{i \in R} \exp\left[-\frac{1}{2}\left(\frac{x_i - x'_i}{\sigma_x}\right)^2 - \frac{1}{2}\left(\frac{y_i - y'_i}{\sigma_y}\right)^2 - \frac{1}{2}\left(\frac{z_i - z'_i}{\sigma_z}\right)^2\right]$$

where
- $(x'_i, y'_i, z'_i)$ is a set of coordinates estimates for an ith reference device determined by using a reference location system (e.g., GPS, TDOA),
- $(x_i, y_i, z_i)$ is a set of postulated coordinates for an ith wireless device, and
- R is a sub-set of wireless devices involved in determining each others location that have are equipped with a reference location technology, and
- $\sigma_x$, $\sigma_y$, $\sigma_z$ are respectively, the standard deviations with which the reference location system is able to measure x, y, and z coordinates of the reference devices.

According to a preferred embodiment of the invention a graph function is obtained by substituting the right hand side of the channel attenuation model (CH_A_1) for $P_{i,j}$ and $P'_{i,j}$ in Sub_Exp_8, and taking the negative of the natural logarithm of the product of the Sub_Exp_8, Sub_Exp_9, and Sub_Exp_10. After algebraic simplification, the resulting graph function takes the form:

$$GF1 = \frac{b^2}{8} \sum_{i=1}^{N} \sum_{j \in H_i}^{i-1} \left(\ln \frac{d'^2_{i,j}}{d^2_{i,j}}\right)^2 -$$

$$\sum_{i=1}^{N} \sum_{j \in H_i, j \neq i} \ln\left\{\int_{\frac{b}{2}\ln\frac{d^2_{ith}}{d^2_{i,j}}}^{\infty} \exp\left[-\frac{1}{2}\left(\frac{S}{\sigma_{db}}\right)^2\right] dS\right\} + \frac{1}{2} \sum_{i \in R} d^2_{i'i'}$$

where, $b = 10n/(\sigma_{db}\ln 10)$, $$d_{i',i'} = \left(\frac{(x_i - x'_i)^2}{\sigma_x^2} + \frac{(y_i - y'_i)^2}{\sigma_y^2} + \frac{(z_i - z'_i)^2}{\sigma_z^2} +\right)^{(1/2)}$$

$d'_{i,j}$ is the distance between the ith and jth devices, as determined by plugging in the measured power reaching one of the devices from the other by using into the channel attenuation model CH_A_1, and solving for $d_{i,j}$, ($x'_i$, $y'_i$, $z'_i$) are the coordinates of an ith device obtained from a reference location technology (e.g., GPS), $d_{i,j}$ is the distance between the postulated coordinates of the ith and ith devices, i.e., $$d_{i,j} = \sqrt{(X_i - X_j)^2 + (Y_i - Y_j)^2 + (Z_i - Z_j)^2},$$

($x_i$, $y_i$, $z_i$) is the set of postulated coordinates for the ith device, ($x_j$, $y_j$, $z_j$) is the set of postulated coordinates for the jth device, and $d_{th}$ is the distance separating a receiving wireless device from a transmitting wireless device at which a signal received will be at a threshold level for detection. $d_{th}$ is determined using the channel attenuation model taking into account the threshold power level for receivers used in the system.

After simplification (that includes combining exponential and natural log operators) it is not readily apparent that the graph function GF1 includes the Sub_Exp_8, Sub_Exp_9, and Sub_Exp_10. However algebraic simplifications do not alter the properties GF1.

For certain kinds of optimization routines, e.g. the conjugate gradient method, the derivatives of the graph function with respect to variables are needed. These can be determined from the expression for GF1 by calculus.

If TOA measurements are used in lieu of RSSI the following sub-expression can be included in the graph function instead of Sub_Exp_8:

$$\text{Sub\_Exp\_11} = \prod_{i=1}^{N} \prod_{j \in H_i, j \neq i} \left\{ \exp\left[ -\frac{1}{2}\left( \frac{d_{i,j} - d'_{i,j}}{\sigma_d} \right)^2 \right] \right\}$$

where $d_{i,j}$ is the distance between the ith and jth wireless devices in terms of the postulated coordinates, $d'_{i,j}$ is preferably a corrected distance measured between ith and jth devices, and $\sigma_d$ is the uncertainty that characterizes the measurement of the distance between the two devices.

TOA measurements tend to overestimate the distance due to multi-path effects. In the case of TOA measurement $d_{i,j}$ corrected by operating on a measured distance using a formula that returns a value which is less than the measured distance. More preferably, $d_{i,j}$ is obtained by subtracting a predetermined constant from the measured distance. Alternatively $d_{Ni,j}$ is the measured distance itself. In all cases $d_{i,j}$ depends on the measured distance.

In the case in which smart antennas are provided in the system and their orientation is known (e.g. by virtue of being mounted at fixed location such as a base station) then the graph function preferably includes a sub expression of the following form:

$$\text{Sub\_Exp\_12} = \exp\left\{ -\frac{1}{2}\left( \frac{\theta_i - \arctan\left(\frac{y_i - y_s}{x_i - x_s}\right)}{\sigma_\theta} \right)^2 \right\}$$

where $x_i$ is the postulated x coordinate of an ith device, $y_i$ is the postulated y coordinate of the ith device, $x_s$ is the x coordinate of a device equipped with a smart antenna, $y_s$ is the y coordinate of the device equipped with the smart antenna, $\theta_i$ is the angle to the ith device measured by the smart antenna DOA algorithm, and $\sigma_\theta$ is the standard deviation that characterizes the error in the measurement of θi.

Sub_Exp_12 depends on postulated coordinates for the ith device and the measured angle $\theta_i$ for the ith device. The arctan(($y_i-y_s$)/($x_i-x_s$)) sub-sub-expression predicts the measured angle based on the postulated coordinates. Sub_Exp_11 has an extremum (a maximum) when the angle measurement that is predicted based on the postulated coordinates matches the angle measured.

In the case that mobile devices are provided with smart antennas, measurements of the differences between the angle at which signals are received at a first device from a second and a third device can be used in estimating locations of the first second and third devices, as well as other devices in their vicinity. To incorporate measurements of the difference between angles at which signals arrive at a smart antenna the graph function preferably includes a sub-expression of the following form:

$$\text{Sub\_Exp\_13} = \prod_{i=1}^{N} \prod_{k=1}^{m(i)} \prod_{j=k+1}^{m(i)} \exp\left\{ -\frac{1}{2}\left( \frac{\text{angle\_meas}(i, j, k) - \text{angle\_post}(i, j, k)}{\sigma_{angle}} \right)^2 \right\}$$

where angle_meas(i,j,k) is the difference, measured using a smart antenna located at the ith device, between the direction toward the jth device and the direction toward the kth device (angle_meas(i,j,k) is determined at the ith device based on signals received from the jth and kth devices), $\sigma_{angle}$ is the standard deviation of the error in measuring angle_meas(i,j,k), m(i) is the number of wireless devices within range of the ith device.

angle_post(i,j,k) is found using the law of cosines to be:

$$\pi - \arccos\left( \frac{c^2 - a^2 - b^2}{ab} \right)$$

where $$a = \sqrt{((x_i - x_j)^2 + (y_i - y_j)^2 + (z_i - z_j)^2)}$$

$$b = \sqrt{((x_i - x_k)^2 + (y_i - y_k)^2 + (z_i - z_k)^2)}$$

$$c = \sqrt{((x_j - x_k)^2 + (y_j - y_k)^2 + (z_j - z_k)^2)}$$

where ($X_i,Y_i,Z_i$) ($X_j,Y_j,Z_j$) ($X_k,Y_k,Z_k$) are the postulated coordinates of the ith, jth and kth wireless devices respectively.

Numerous approaches are known for determining extremum of functions that can be applied to finding values of the postulated coordinates that maximize the graph function. Among these are the Conjugate Gradient method which is described in Press, W. H. et al., *Numerical Recipes*, N.Y., Cambridge University Press, 1986. p. 302–307, the Simulated Annealing method which is also described in *Numerical Recipes* at p.326–334, and Genetic Algorithm methods as described in Fogel, D. B. *An Introduction to Simulated Evolutionary Optimization. IEEE Transactions on Neural Networks*, Vol. 5, No. 1 (January 1994). Rather than deriving a single expression graph function, the graph function can be embodied in a hierarchy of sub-routines. For example each sub-expression of the graph function can be expressed in a programming subroutine. The processing node 132 is preferably provided with a program stored in program memory 320 that implements an optimization routine for finding an extremum of the graph function. Alternatively the optimization routine can be performed by multiple nodes, e.g. wireless devices 112–132. In the case that the optimization routine is performed by multiple devices, each device can, for example, evaluate certain terms, or certain derivatives of the graph function, and share the result with other devices.

Figure 7:
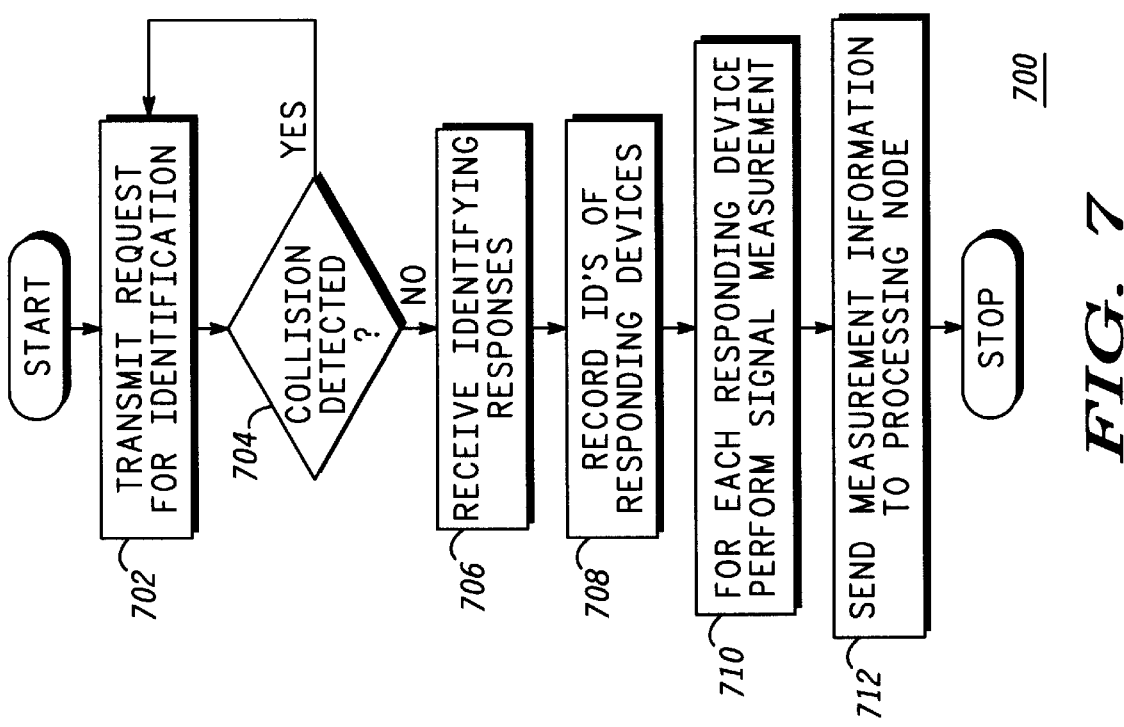
FIG. 7 is a flow diagram of a process performed by a wireless device to determine its distance from neighboring wireless devices according to a preferred embodiment of the invention.

FIG. 7 is a flow diagram of a process 700 performed by a wireless device to determine its distance from neighboring wireless devices. Process 700 is shown from the perspective of an ith wireless device. In process block 702 the ith wireless device sends out a request for identification. The request for identification will reach other wireless devices within a limited range of the ith wireless device that is dictated by the power with which the request for identification is transmitted, and the nature and arrangement of any obstructions in the vicinity of the ith device. Process block 704 is a decision block, the outcome of which depends on whether a collision is detected in signals received by the ith device. If a collision is detected then the process loops back to process block 702. If a collision is not detected then the process continues with process block 706 in which identifying responses are received from wireless devices in the vicinity of the ith wireless device. In process block 708, ID's of devices which responded in process block 706, which were received in their responses, are recorded in a memory in the ith device (e.g., RAM 318 (FIG. 3).

In process block 710, for each wireless device from which responses were received in process block 706 signal measurements are made. Each signal measurement preferably comprises a two-way TOA of arrival measurement. In making the two-way TOA measurement, the ith device preferably sends out message using the pseudo random number, and encoding the identification of specific device from which a response is being solicited. The identification can be encoded using the pseudo random number according to a Direct Sequence Code Division Multi Access (DS-CDMA) technique. A response is then received at the ith device, and the delay in receiving the response is used to determine the distance to between the ith device and the responding device. Alternatively, each signal measurement can comprise an RSSI signal measurement which is used in conjunction with a channel model (e.g., CH_A_1) to calculate the distance between and ith device and the responding device. Alternatively, each signal measurement can comprise a DOA measurement. The signal measurements can include combinations of different types of signal measurements selected from the group including but not limited to DOA, RSSI, and TOA. It is also possible to base the signal measurement on the identifying signals received in process block 706.

If the ith device is equipped with a reference location technology such as GPS then a reference location estimate will be obtained. In process block 712, the result of the signal measurement, and reference location estimates for the ith device in the case that the ith device is equipped with a reference location technology are communicatively coupled to the processing node 132. The result of the signal measurement and reference location estimates, may be transmitted directly to the processing node 132, however preferably the results are relayed through a series of other wireless devices 112–132 (FIG. 1) 222–228 (FIG. 2), before reaching the processing node 132. Relaying the information in a sequence of transmissions between processing nodes has the advantage that less power is required for transmission. An adhoc network can be established among devices involved in determining each other's location for the purpose of communicating measurement information to the processor node 132 (FIG. 1). In an adhoc network transmission power is conserved because messages are transmitted between neighboring devices rather than being transmitted directly to a destination. Transmitting messages via multiple hops, as is done in an adhoc networks also has the advantage that a device that is not reachable directly, (e.g., the processor node) may be reachable if a message is routed through a neighboring device. The route via a neighboring device may circumvent a barrier to direct line of sight transmission.

Process 700 can be embodied in a program which is executed in response to detecting an interrupt that is triggered by the accelerometer 330 carried by the ith device. In response to the interrupt the ith device could also transmit a message to other wireless devices requesting that they also execute process 700. Alternatively, in response to the interrupt, the ith device could transmit a message to the processing node 132 (FIG. 1) indicating that it has moved, and in response to receiving that message the processing node 132 (FIG. 1) could transmit messages to selected other wireless devices requesting that they also execute process 700. Selection of other wireless devices could be based on their being within a predetermined distance from the ith wireless device based on their last known location. The last known locations of devices can be recorded in RAM 318 (FIG. 3).

Figure 8:
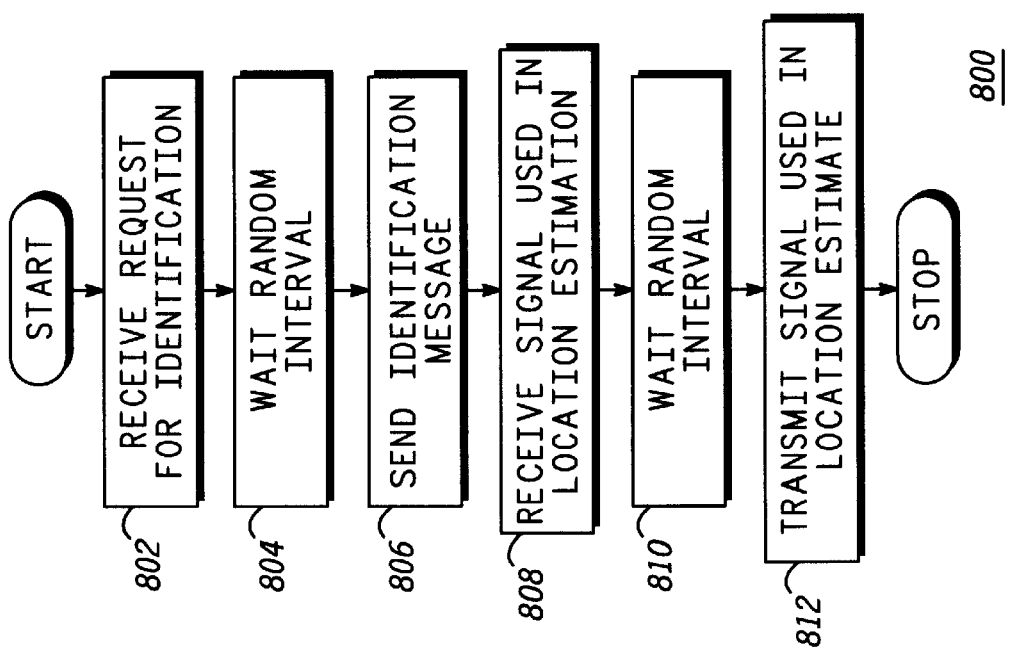
FIG. 8 is a flow diagram of a process performed by a wireless device in response to the process shown in FIG. 7.

FIG. 8 is a flow diagram of a process 800 performed by a wireless device in response to the process shown in FIG. 7. FIG. 8 is shown from the perspective of a jth device. In process block 802 a request for identification is received by the jth device from the ith device. Process block 804 is a first random delay for the purpose of avoiding transmission collisions. In process block 806 an identification message is sent from the jth device to the ith device. (As stated above the signal measurement can be based on the message transmitted in process block 806.) In process block 808 a signal used in location estimation is received. The signal received in process block 808 can, for example, comprise a DS-CDMA signal based on the pseudo random number. Process block 810 is second random delay (e.g., the interval T discussed above in connection with FIG. 5). In process block 812, a signal used in location estimation is transmitted from the jth device back to the ith device. The signal received in process block 808 and the signal transmitted in process block 810 can be signals used in a two-way time of arrival measurement such as discussed in connection with the transceiver shown in FIG. 5.

Executing process 700 on each of N devices involved in determining each others location will result in two redundant measurements being obtained for each edge (one from each node at the ends of the edge). The actual measurement values are preferably an average of the two redundant measurements.

Figure 9:
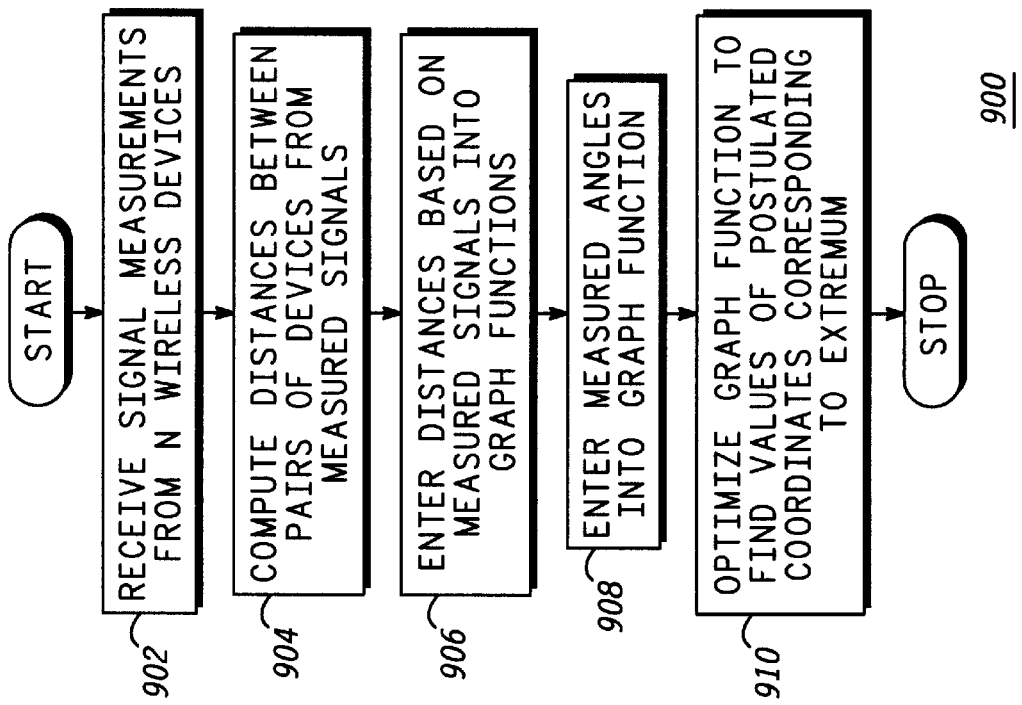
FIG. 9 is a flow diagram of a process performed by a processing node to estimate the location of a plurality of wireless devices according to a preferred embodiment of the invention.

FIG. 9 is a flow diagram of a process performed by a processing node 132 (FIG. 1) to estimate the location of a plurality of wireless devices. In process block 902, the results of signal measurements and reference location estimates (as transmitted in process block 712 (FIG. 7)) are received from a plurality (N) wireless devices. In process block 904 distances are computed based on signal measurements used to measure distance. Process block 904 preferably includes a sub-step of averaging redundant measurements for each edge. In lieu of process block 904, the wireless devices involved in the signal measurements can compute distances based on the measurements and convey distance information to the processing node 132 (FIG. 1). In process block 906 the distances based on the signal measurements, and reference technology location estimates are entered into a graph function (e.g. GF1). In process block 908 the result of angle measurements involving wireless devices are entered into the graph function (in the case that the graph function includes sub-expressions that depend on angle measurements). Process block 906 and 908 could be accomplished by calling a graph function optimization sub-routine with the reference technolog location estimates, and distance and angle measurements as call parameters. Process block 904 can be combined with process block 906, which is to say that a sub-routine which optimizes a graph function in which signal measurements appear explicitly, could be called with the results of signal measurements as call parameters. As discussed above the graph function can involve the signal measurements explicitly. In the latter case the signal measurements could be used as call parameters to a graph function optimization sub-routine. In process block 910 the graph function is optimized and the values of the postulated coordinates corresponding to an extremum of the graph function are returned as location estimates for at least a sub-set of mobile wireless devices among the plurality of wireless devices. A program that carries out the process shown in FIG. 9 can be stored in a computer readable medium e.g. program memory (320) shown in FIG. 3.

The channel attenuation model given above (CH_A_1) includes parameter n that characterizes the drop in power as function of distance from the transmitting source. According to a further aspect of this invention the values of parameter n, or other parameters in other channel models are selected based on one or more measurements of power transmitted between reference devices, and the location estimates of the reference devices used to make the power measurements. The selection of the value of a parameter can be based on a single power measurement made between a first reference device and a second reference device, but is preferably based on more than one power measurement involving more than two reference devices. The channel model is optimized by fitting it to data that includes the location estimates and the power measurements between reference devices. According to a preferred embodiment of the invention, the channel model is fit in a least square sense to the aforementioned data. Once parameters of the channel model have been optimized using measurements between reference devices, the channel model with parameters set according to the optimization can be used in the graph function for predicting the signal measurements between blind devices and reference devices, and between pairs of blind devices.

The channel attenuation model given above (CH_A_1) is particularly useful in connection with RSSI based determinations of the distance between wireless devices. However the invention is not limited to using that channel model. For the case of estimating location within an environment where there is a known arrangement of barriers that have known attenuation properties the following channel attenuation model (CH_A_2) is useful in connection with RSSI based distance determination:

$$P_{i,j} = P_o(d_0) - 10n \log\left(\frac{d_{i,j}}{d_o}\right) - \sum_{l=1}^{M} X_l A_{i,j}^l \quad (\text{CH\_A\_2})$$

where

M is the number of types of barriers in the particular environment, $X_l$ is the attenuation of an lth type of barrier in the environment, $A_{i,j}^l$ is the number of barriers of the lth type that are intercepted by a line between postulated positions of the ith and jth devices, and other symbols are given above.

For example in the case of the case of the floor plan 100 (FIG. 1) M=3, and $X_1$, $X_2$, and $X_3$ correspond to the attenuation experienced in passing through the cubical walls, perimeter wall 102 (FIG. 1), and the walls of the walled offices 108 (FIG. 1) shown in FIG. 1 respectively. Channel attenuation model CH_A_2 is used in conjunction with a computer data representation of a map, for example a floor plan such as that shown in FIG. 1. The computer representation of the map or floor plan is used in conjunction with CH_A_2 in evaluating a graph function, or the graph function's derivatives, for the purpose of optimization, and location estimation. The computer representation of the map is used determine the number and type of barriers that a line between the postulated coordinates of two devices intersect. The number and type of barriers are then used to evaluate the summation of CH_A_2, so that a predicted power can be determined using CH_A_2 based on the postulated coordinates.

Note that CH_A_2 has a number of parameters in addition to n parameters $X_l$ that determine the power transmitted between two wireless devices. It is also possible to characterize a signal environment, or in other words optimize the parameters of the channel model n, $X_l$ by fitting CH_A_2 to the results of multiple measurements between reference devices. Location estimates for reference devices, and measurements of signals transmitted between reference devices can be used to select values for the parameters (n, $X_l$) of channel attenuation model. One way of accomplishing this parameter value selection is to fit the channel model equation to the measurement data in a least squares sense. In the case of least squares fitting more measurements are taken than there are parameters to be determined in the channel model. Preferably at least M+2 measurement each involving different pairs of reference devices are used in selecting the values of the parameters parameters (n, $X_l$). In as much as CH_A_2 is linear in the $X_l$'s and n, linear algebra can be used to determine a least squares solution for these parameters. The parameters of other channel models that are not explicitly disclosed, can also be optimized, e.g. by least square fit, based on reference device measurements.

The system disclosed above, has the advantage that the location estimates that it determines tend to become more accurate as the number of devices involved in the location estimate increases. The latter is especially auspicious in view of the fact that wireless devices are expected to proliferate in the coming decade.

A further advantage of the system disclosed above is that the power at which ranging signals are transmitted by each wireless communication device can be low because the ranging signals only need to reach a few of the closest neighboring wireless communication devices, and not a distant fixed base station. By the same token the need for a large number of fixed base stations which might otherwise be necessary to insure that there is a fixed based station within range at a reasonable power level of each device is obviated. Neither are a large number of fixed base stations necessitated in order to obtain an accurate location estimate.

What is claimed is:

1. A method of estimating unknown locations of wireless devices, the method including the steps of:

receiving a measurement of a first signal transmitted between the first and the second wireless devices having unknown locations to obtain a signal measurement;

optimizing a function that depends on the signal measurement, a set of postulated coordinates for the first wireless device, and a set of postulated coordinates for the second wireless devices; and estimating locations for the first and second wireless devices based at least in part on the optimized function.

2. The method according to claim 1 wherein the step of receiving a measurement of a signal includes the sub-step of:

receiving a measurement of an offset time that depends on a difference between a first time at which a second signal was sent from the first device to a second device and a second time at which the first signal was received at the first device after being sent by the second device in response to the second signal.

3. A method of estimating unknown locations of wireless devices, the method including the steps of:

receiving a measurement of a first signal transmitted between the first and the second wireless devices to obtain a signal measurement, and optimizing a function that depends on the signal measurement, a set of postulated coordinates for the first wireless device, and a set of postulated coordinates for the second wireless devices;

wherein the step of optimizing the function comprises the sub-step of optimizing a function that includes a sub-expression of the form:

$$\text{Sub\_Exp\_9} = \prod_{i=1}^{N} \prod_{j \notin H_i, j \neq i} \int_{P_{i,j}-P_{thresh}}^{\infty} \exp\left[-\frac{1}{2}\left(\frac{S}{\sigma_{db}}\right)^2\right] dS$$

where i is a first index that denotes an ith wireless devices involved in a location estimation calculation, j is a second index that denotes a jth wireless devices involved in a location estimation calculation, N is a number of wireless devices involved in estimating each other's location, $H_i$ is a set of all wireless devices that are in range of an ith wireless device, device, $P_{i,j}$ is an estimate of $P'_{i,j}$ based on a channel attenuation model, and postulated coordinates for the ith and jth devices, and $\sigma_{dB}$ is a standard deviation ascribed to a measurement process used to measure P'i,j, and $P_{thresh}$ is the threshold power which can be detected by a wireless device.

4. The method according to claim 1 wherein the step of optimizing the function comprises the sub-step of optimizing a function that includes a sub-expression of the form:

$$\text{Sub\_Exp\_10} = \prod_{i \in R} \exp\left[-\frac{1}{2}\left(\frac{x_i - x'_i}{\sigma_x}\right)^2 - \frac{1}{2}\left(\frac{y_i - y'_i}{\sigma_y}\right)^2 - \frac{1}{2}\left(\frac{z_i - z'_i}{\sigma_x}\right)^2\right]$$

where $(x'_i, y'_i, z'_i)$ is a set of coordinates for an ith reference device determined by using a reference location technology, $(x_i, y_i, z_i)$ is a set of postulated coordinates for an ith wireless device, R is a sub-set of wireless devices involved in determining each others location that are equipped with a reference location technology, and $\sigma_x, \sigma_y, \sigma_z$ are respectively, the standard deviations with which the reference location technology is able to measure x, y, and z coordinates of the reference devices.

5. The method according to claim 1 wherein the step of optimizing the function comprises the sub-step of optimizing a function that includes a sub-expression of the form:

$$GFI = \frac{b^2}{8} \sum_{i=1}^{N} \sum_{j \in H_i}^{i-1} \left(\ln\frac{d'^2_{i,j}}{d^2_{i,j}}\right)^2 -$$

$$\sum_{i=1}^{N} \sum_{j \notin H_i, j \neq i} \ln\left\{\int_{\frac{b}{2}\ln\frac{d^2_{th}}{d^2_{i,j}}}^{\infty} \exp\left[-\frac{1}{2}\left(\frac{S}{\sigma_{db}}\right)^2\right] dS\right\} + \frac{1}{2}\sum_{i \in R} d^2_{i'i'}$$

where, $b = 10n/(\sigma_{db}\ln 10)$, $$d_{i',i'} = \left(\frac{(x_i - x'_i)^2}{\sigma_x^2} + \frac{(y_i - y'_i)^2}{\sigma_y^2} + \frac{(z_i - z'_i)^2}{\sigma_z^2} + \right)^{(1/2)}$$

$d'_{i,j}$ is the distance between the an ith device and a jth device, as determined from a signal power measurement, $$d_{i,j} = \sqrt{(X_i - X_j)^2 + (Y_i - Y_j)^2 + (Z_i - Z_j)^2}$$

$(x'_i, y'_i, z'_i)$ is a set of coordinates for an ith reference device determined by using a reference location technology, $(x_i, y_i, z_i)$ is a set of postulated coordinates for an ith wireless device, $\sigma_x, \sigma_y, \sigma_z$ are respectively, the standard deviations with which the reference location technology is able to measure x, y, and z coordinates of the reference devices, $\sigma_{dB}$ is a standard deviation ascribed to a measurement process used to make signal power measurements, and $d_{th}$ is the distance separating a receiving wireless device from a transmitting wireless device at which a signal received will be at a threshold level for detection.

6. The method according to claim 1 wherein the step of optimizing the function comprises the sub-step of optimizing a function that includes a sub-expression of the form:

$$\text{Sub\_Exp\_11} = \exp\left\{-\frac{1}{2}\left(\frac{\theta_i - \arctan\left(\frac{y_i - y_s}{x_i - x_s}\right)}{\sigma_\theta}\right)^2\right\}$$

where $x_i$ is a postulated x coordinate of an ith device $y_i$ is a postulated y coordinate of the ith device $x_s$ is an x coordinate of a device equipped with a smart antenna, $y_s$ is an y coordinate of the device equipped with the smart antenna, $\theta_i$ is the angle to the ith device measured by the smart antenna DOA algorithm, and $\sigma_\theta$ is the standard deviation that characterizes the error in the measurement of $\theta m$.

7. The method according to claim 1 wherein the step of optimizing the function comprises the sub-step of optimizing a function that includes a sub-expression of the form:

$$\text{Sub\_Exp\_12} = \prod_{i=1}^{N}\prod_{k=1}^{m(i)}\prod_{j=k+1}^{m(i)} \exp\left\{-\frac{1}{2}\left(\frac{\text{angle\_meas}(i,j,k) - \text{angle\_post}(i,j,k)}{\sigma_{angle}}\right)^2\right\}$$

where, angle_meas(i,j,k) is the difference measured using a smart antenna at an ith device between a direction toward a jth device and the direction toward a kth device, $\sigma_{angle}$ is a standard deviation of the error in measuring angle_meas(i,j,k), m(i) is a number of wireless devices within range of the ith device, angle_post(i,j,k) is found using the law of cosines to be:

$$\pi - \arccos\left(\frac{c^2 - a^2 - b^2}{ab}\right)$$

where $$a = \sqrt{((x_i - x_j)^2 + (y_i - y_j)^2 + (z_i - z_j)^2)}$$
$$b = \sqrt{((x_i - x_k)^2 + (y_i - y_k)^2 + (z_i - z_k)^2)}$$
$$c = \sqrt{((x_j - x_k)^2 + (y_j - y_k)^2 + (z_j - z_k)^2)}$$

where $(X_i,Y_i,Z_i)$ $(X_j,Y_j,Z_j)$ $(X_k,Y_k,Z_k)$ are postulated coordinates of the ith, jth and kth wireless devices respectively.

8. The method of claim 1 further comprising the steps of:
detecting a signal from an accelerometer, and initiating a step of measuring a signal and the step of optimizing in response to detecting the signal.

9. The method according to claim 1 further comprising a step of:
calculating a distance between the first and second wireless devices based on the measurement.

10. The method according to claim 1 wherein the step of optimizing includes a sub-step of:
optimizing a function that depends on a statistical model parameter.

11. The method according to claim 10 wherein the step of optimizing includes a sub-step of:
optimizing a function that depends on a standard deviation of the signal measurement.

12. The method of claim 1 further comprising the step of:
determining that a third device and the first device are out of range of each other.

13. The method according to claim 12 wherein the step of optimizing comprises the sub-step of:
optimizing a function that includes a sub-expression that depends on a distance between the first and third devices, that is determined based on a set of postulated coordinates for the set of postulated coordinates for the first device, and is a monotonic function of the distance between the first and third devices.

14. The method according to claim 13 wherein the step of optimizing comprises the sub-step of:
optimizing a function that includes a sub-expression that depends on a distance between the first and third devices, that is determined based on a set of postulated coordinates for the set of postulated coordinates for the first device, and asymptotically approaches a fixed value as the distance between the first and third devices increases.

15. The method according to claim 12 wherein the step of optimizing comprises the sub-step of:
optimizing a function that includes a sub-expression that depends on a distance between the first and third devices, that is determined based on a set of postulated coordinates for the set of postulated coordinates for the first device, and has an extremum at a distance greater than a threshold distance for communication between the first and third devices.

16. The method according to claim 1 wherein the step of optimizing a function comprises the sub-step of:
optimizing a function that includes a first sub-expression that depends on the postulated coordinates of the first device, and a second sub-expression that depends on the postulated coordinates of the first device.

17. The method according to claim 16 wherein the step of optimizing a function comprises the sub-step of:
optimizing a function that includes a first sub-expression that depends on the postulated coordinates of the first device, and the postulated coordinates of the second device, and a third sub-expression that depends on the postulated coordinates of the second device.

18. The method according to claim 1 further comprising the step of:
receiving a measurement of a second signal transmitted between the second device and a first reference device.

19. The method according to claim 18 wherein the step of optimizing the function includes the sub-step of:
optimizing a function including a sub-expression that depends on a set of postulated coordinates for the first reference device.

20. The method according to claim 19 wherein the step of receiving a measurement of the first signal transmitted between the second device and the first reference device includes the sub-step of:
receiving a measurement of an angle at which the signal arrives at the first reference device to obtain a first angle measurement, and
wherein the step of optimizing the function includes the sub-step of:

optimizing a function including a sub-expression that depends on the set of postulated coordinates for the second device and the first angle measurement.

21. The method according to claim 20 wherein the step of receiving a measurement of a signal comprises the sub-step of:
receiving a measurement of a first angle at which the first signal arrives at the first device from the second device to obtain a first angle measurement.

22. The method according to claim 21 further comprising the step of:
receiving a measurement of a second angle at which a second signal arrives at the first device from a third device to obtain a second angle measurement.

23. The method according to claim 22 herein the step of optimizing the function comprises the sub-step of:
optimizing a function that depends on a difference between the first angle measurement and the second angle measurement, and postulated coordinates for the first, second, and third devices.

24. The method according to claim 1 wherein the step of optimizing the function comprises the sub-step of:
optimizing a function that includes a first sub-expression that gives a predicted signal measurement based on the postulated coordinates.

25. The method according to claim 24 wherein the step of optimizing the function comprises the sub-step of:
optimizing a function that includes a second sub-expression that includes the first sub-expression and has an extrememum when the signal measurement equals the predicted signal measurement.

26. The method according to claim 25 wherein the step of optimizing the function comprises the sub-step of:
optimizing a function that includes a channel model that predicts the signal measurement based on the postulated coordinates.

27. The method according to claim 26 further comprising the steps of:
making a signal measurement at a reference device to obtain a reference measurement,
obtaining a location estimate for the reference device, and
selecting channel model parameters by fitting the channel model to data that includes the location estimate and the reference measurement.

28. The method according to claim 27 wherein the step of optimizing the function that includes a channel attenuation model comprises the sub-step of:
optimizing a function that includes a channel attenuation model sub-expression of the form:

$$P_{i,j} = P_o(d_0) - 10n \log\left(\frac{d_{i,j}}{d_o}\right) (CH\_A\_1)$$

do is a reference distance used to make a reference measurement,
where $P_{i,j}$ is a power in decibels predicted to reach the first device from the second device,
Po is a power meassurement at the calibration distance, $$d_{i,j} = \sqrt{(X_i - X_j)^2 + (Y_i - Y_j)^2 + (Z_i - Z_j)^2}$$

where
$(X_i,Y_i,Z_i)$ is a set of postulated coordinates for the first device, and $(X_j,Y_j,Z_j)$ is a set of postulated coordinates for the second device, and
n is an experimentally determined parameter for a given environment, that characterizes a loss in power as a function of distance.

29. The method of claim 28 further comprising the steps of:
receiving a measurement of the power transmitted between a first reference device and a second reference device to obtain a first power measurement,
obtaining location estimates for the first and second reference devices,
selecting the value of n by fitting the channel attenuation model to first power measurement, and the location estimates for the first and second reference devices.

30. The method according to claim 26 wherein the step of optimizing the function that includes a channel attenuation model comprises the sub-step of:
optimizing a function that includes a channel attenuation model of the form:

$$P_{i,j} = P_o(d_0) - 10n \log\left(\frac{d_{i,j}}{d_o}\right) - \sum_{l=1}^{M} X_l A_{i,j}^l$$

where
do is a reference distance used to make a reference measurement,
$P_{i,j}$ is a power in decibels predicted to reach an ith device from a jth device,
Po is a power measurement at the calibration distance, $$d_{i,j} = \sqrt{(X_i - X_j)^2 + (Y_i - Y_j)^2 + (Z_i - Z_j)^2}$$

where
$(X_i,Y_i,Z_i)$ is a set of postulated coordinates for the ith device,
$(X_j,Y_j,Z_j)$ is a set of postulated coordinates for the jth device, and
n is an experimentally determined parameter for a given environment, that characterizes a loss in power as a function of distance,
M is the number of types of barriers in the particular environment,
$X_l$ is the attenuation of an Ith type of barrier in the environment,
$A_{i,j}^l$ is the number of barriers of the Ith type that are intercepted by a line between postulated positions of the ith and jth devices.

31. The method of claim 30 further comprising the steps of:
performing a plurality of signal measurements between reference devices to obtain a plurality of reference signal measurements,
obtaining location estimates for reference devices involved in the plurality of signal measurements, and
determining values for $A_{i,j}^l$ and n by fitting the channel attenuation model to the plurality of reference signal measurements and location estimates.

32. The method of claim 31 wherein the step of performing a plurality of measurements includes the sub-step of:
performing a least M+2 signal measurements between reference devices to obtain a plurality of reference signal measurements.

33. A method of estimating unknown locations of wireless devices, the method including the steps of:
  receiving a measurement of a first signal transmitted between the first and the second wireless devices to obtain a signal measurement, and
  optimizing a function that depends on the signal measurement, a set of postulated coordinates for the first wireless device, and a set of postulated coordinates for the second wireless devices;
  wherein the step of optimizing the function comprises the sub-step of:
    optimizing a function that includes a sub-expression of the form:

$$\text{Sub\_Exp\_11} = \prod_{i=1}^{N} \prod_{j \in H_i, j \neq i} \left\{ \exp\left[-\frac{1}{2}\left(\frac{d_{i,j} - d'_{i,j}}{\sigma_d}\right)^2\right] \right\}$$

where,
    i denotes an ith wireless device involved in a location estimation calculation,
    j denotes a jth wireless devices involved in a location estimation calculation,
    N is a number of devices involved in a location estimate,
    $H_i$ is a number of device within range of the ith device,
    $d_{i,j}$ is a distance between the ith and the jth device in terms of postulated coordinates,
    $d'_{i,j}$ depends on the measurement of distance separating the ith and jth devices that is deduced from the signal measurement, and
    $\sigma_d$ is a is an uncertainty that characterizes the signal measurement.

34. The method according to claim 33 further comprising the step of:
  calculating a value of $d'_{i,j}$ by operating on a measured distance using a formula that returns a value which is less than the measured distance.

35. The method according to claim 33 further comprising the steps of:
  calculating a value of $d'_{i,j}$ by subtracting a predetermined value from a measured distance.

36. The method according to claim 1 wherein the step of optimizing the function comprises the sub-step of optimizing a function that includes a sub-expression of the form:

$$\text{Sub\_Exp\_8} = \prod_{i=1}^{N} \prod_{j \in H_i, j \neq i} \left\{ \exp\left[-\frac{1}{2}\left(\frac{(P_{i,j} - P'_{i,j})}{\sigma_{db}}\right)^2\right] \right\}$$

where
  i is a first index that denotes an ith wireless devices involved in a location estimation calculation,
  j is a second index that denotes a jth wireless devices involved in a location estimation calculation,
  N is a number of wireless devices involved in estimating each other's location,
  $H_i$ is a set of all wireless devices that are in range of an ith wireless device,
  $P'_{i,j}$ is a measurement of power transmitted between the ith device and a jth wireless device,
  $P_{i,j}$ is an estimate of $P'_{i,j}$ based on a channel attenuation model, and postulated coordinates for the ith and jth devices, and
  $\sigma_{dB}$ is a standard deviation ascribed to a measurement process used to measure $P'_{i,j}$.

37. The method according to claim 36 wherein the step of optimizing the function comprises the sub-step of optimizing a function that includes a sub-expression of the form:

$$\text{Sub\_Exp\_10} = \prod_{i \in R} \exp\left[-\frac{1}{2}\left(\frac{x_i - x'_i}{\sigma_x}\right)^2 - \frac{1}{2}\left(\frac{y_i - y'_i}{\sigma_y}\right)^2 - \frac{1}{2}\left(\frac{z_i - z'_i}{\sigma_z}\right)^2\right]$$

where
  ($x'_i$, $y'_i$, $z'_i$) is a set of coordinates for an ith reference device determined by using a reference location technology,
  ($x_i$, $y_i$, $z_i$) is a set of postulated coordinates for an ith wireless device,
  R is a sub-set of wireless devices involved in determining each others location that are equipped with a reference location technology, and
  σx σy, σz are respectively, the standard deviations with which the reference location technology is able to measure x, y, and z coordinates of the reference devices.

38. A processing node comprising:
  a receiver for receiving a first result of a first signal measurement of a first signal transmitted between a first unknown location device and a second unknown location device, and
    a second result of a second signal measurement of a second signal transmitted between the second unknown location device and a known location device,
  a processor for optimizing a function of the first signal measurement, the second signal measurement, postulated coordinates of the first unknown location device, and the second unknown location device in terms of postulated coordinates of the first unknown location device, and the second unknown location device,
  whereby locations of the first and second unknown location devices are estimated.

39. The processing node according to claim 38 further comprising:
  an external system communication interface system.

40. A location estimation system comprising:
  a plurality of wireless devices, each comprising:
    a signal measurer, and
    a transmitter for transmitting a signal measurement, and
  a processing node comprising:
    a receiver for receiving
      a first result of a first signal measurement of a first signal transmitted between a first unknown location device and a second unknown location wireless device,
      a second result of a second signal measurement of a second signal transmitted between the second unknown location wireless device and a known location device, and
    a processor for optimizing a function of the first signal measurement, the second signal measurement, postulated coordinates of the first unknown location device, and the second unknown location device in terms of postulated coordinates of the first unknown location device, and the second unknown location device.

41. A computer readable medium containing programming instructions for of estimating locations of a set of wireless devices including a first wireless device and a second wireless device the locations of which are unknown, the computer readable medium including programming instructions for:

receiving a measurement of a first signal transmitted between the first and the second wireless devices having unknown locations to obtain a signal measurement;

optimizing a function that depends on the signal measurement, a set of postulated coordinates for the first wireless device, and a set of postulated coordinates for the second wireless devices; and estimating locations for the first and second wireless devices based at least in part on the optimized function.

42. The computer readable medium according to claim 41 wherein the programming instructions for optimizing includes programming instructions for:

optimizing a function that depends on a standard deviation of the signal measurement.

43. The computer readable medium according to claim 41 wherein the programming instructions for optimizing a function include programming instructions for:

optimizing a function that includes a first sub-expression that depends on the postulated coordinates of the first device, and a second sub-expression that depends on the postulated coordinates of the first device.

44. The computer readable medium according to claim 41 further including programming instructions for:

receiving a measurement of a second signal transmitted between the second device and a first reference device.

45. The computer readable medium according to claim 41 wherein the programming instructions for optimizing the function include programming instructions for:

optimizing a function including a sub-expression that depends on a set of postulated coordinates for the first reference device.

\* \* \* \* \*